Jan. 10, 1950     A. LINDZY     2,493,983
COOKING UTENSIL
Filed Oct. 23, 1944

INVENTOR.
ARTHUR LINDZY
BY
Earl D. Chappell
ATTORNEYS.

Patented Jan. 10, 1950

2,493,983

UNITED STATES PATENT OFFICE 2,493,983

COOKING UTENSIL

Arthur Lindzy, Kalamazoo, Mich., assignor of one-half to Ora Lindzy, Kalamazoo, Mich.

Application October 23, 1944, Serial No. 559,899

2 Claims. (Cl. 126—390)

The main objects of this invention are:

First, to provide a cooking utensil which may be of substantially greater diameter than the burner on which it is to be used, at the same time the bottom is substantially uniformly heated throughout.

Second, to provide a cooking utensil of this character which is not likely to injure the table or surface portion of the stove top surrounding the burner.

Third, to provide an improved cooking utensil of the griddle or frying pan type in which the bottom is not likely to become warped in use and one in which the heat is very uniformly distributed throughout.

Objects relating to details and economies of the invention will appear from the description to follow. The invention is defined and pointed out in the claims.

A preferred embodiment of the invention is illustrated in the accompanying drawing, in which.

Figure 1:
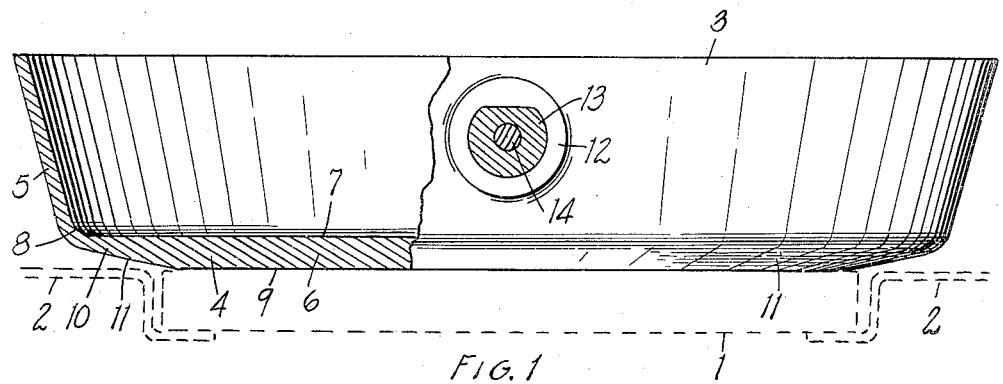
Fig. 1 is a fragmentary view partially in section on a line corresponding to line I—I of a cooking utensil embodying my invention, the utensil being shown in its relation to a burner and stove top which are illustrated by dotted lines.
Figure 2:
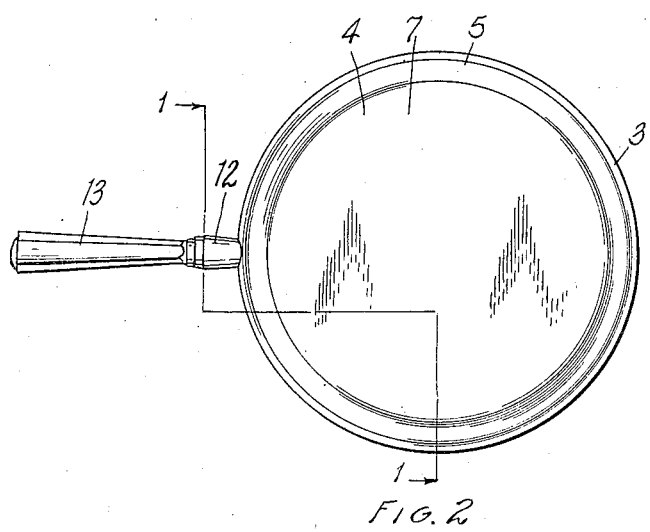
Fig. 2 is a plan view.

In the accompanying drawing, I represents an electric burner unit and 2 the stove top or table portion of the stove. In the accompanying drawing I have illustrated my invention as embodied in a cooking utensil of the spider or frying pan or griddle type which is designated generally by the numeral 3.

The structure comprises a bottom 4 and an outwardly flaring side wall 5. These are formed as an integral casting desirably of aluminum or aluminum alloy although the structure may be formed of other alloys or of cast iron.

The bottom has a central and major portion 6 which is relatively thick as compared to the remainder of the utensil. The upper surface 7 of the bottom is substantially flat throughout and merges into the side wall with a slight curvature at 8. The under side or surface 9 of this thickened central major portion 6 is substantially flat throughout and parallel to the upper surface 7.

This major central portion 6 of uniform thickness is surrounded by an annular portion 10 of gradually decreasing thickness, the under side or surface 11 of this annular portion being upwardly inclined or in effect constituting a beveled extension of the flat under surface 9.

It will be noted that the central portion 6 of the bottom is of approximately the diameter of the burner in the embodiment illustrated. However, this may vary considerably although it is intended that when the utensil is supported on a burner, the upwardly inclined surface 11 will be supported out of contact with the stove top. This avoids discoloration of the stove top and minimizes the chipping of the enamel.

By forming the annular portion 10 of gradually decreasing thickness the heat is effectively transmitted thereto by conduction as well as by the heated gases flowing thereover from the burner so that the bottom of the utensil is substantially uniformly heated throughout and it is found that in structures embodying the invention the food resting on the outer portion of the bottom is as effectively cooked as that resting on the inner portion. The bottom has sufficient body to result in a uniform transmission of the heat or, stated otherwise, in a uniform heating of the bottom. The substantial thickness of the central major portion of the bottom facilitates the transmission of substantial quantities of heat from the same to the annular upwardly inclined portion and thence to the cooking surface above the last named portion. This permits the utensil being of substantially greater diameter than the burner which is especially desirable where the utensil is used as a griddle—for example, in making pancakes, and obviously it is an advantage for cooking or frying any foods. However, utensils of smaller size embodying the inventions are desirable and they are very durable inasmuch as there is substantially no warping of the bottom.

The handle socket 12 is preferably formed integrally with the side walls and the handle 13 is secured within the socket by the screw or bolt 14 extending longitudinally through the handle and clamping it within the socket.

I have illustrated and described my invention in an embodiment which I have found highly practical. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent, is:

1. A cooking utensil comprising a bottom and outwardly flaring side wall formed as an integral casting, the central and major portion of the bottom being relatively thick, the upper surface of the bottom constituting a cooking surface extending to the side wall and flat throughout, the under side of such central and major portion of the bottom being in its substantial entirety substantially flat and parallel with said upper flat surface thereof, said under flat surface portion of the bottom being surrounded with an annular upwardly inclined under surface portion merging into the side wall, the cooking surface extending over said annular upwardly inclined under surface portion, the portion of the cooking surface over said annular upwardly inclined under surface lying in a common plane with the cooking surface over the relatively thick central bottom portion, the outer edge of said annular upwardly inclined under surface being substantially spaced throughout the length of said outer edge above the plane of the under side of the relatively thick central bottom portion, the angle of said annular upwardly inclined portion being such as to clear the top of a stove when said flat under surface is supported by a burner, the substantial thickness of said central major portion of the bottom facilitating the transmission of a substantial quantity of heat from the same to said annular upwardly inclined portion and thence to the cooking surface above the last named portion.

2. A cooking utensil comprising integral bottom and side wall, the bottom having a central portion comprising the major area thereof of a substantially uniform thickness throughout, said thickness substantially exceeding the thickness of the side wall and of such thickness as to minimize warping thereof, the upper surface of said bottom constituting a cooking surface extending to the side wall and flat throughout, such central bottom portion being surrounded by an annular portion upwardly inclined on its under side and of gradually decreasing thickness as compared to the relatively thick central portion of the bottom and merging into the side wall, the cooking surface extending over said annular upwardly inclined under surface portion, the portion of the cooking surface over said annular upwardly inclined under surface lying in a common plane with the cooking surface over the relatively thick central bottom portion, the outer edge of said annular upwardly inclined under surface being substantially spaced throughout the length of said outer edge above the plane of the under side of the relatively thick central bottom portion, the said thick bottom portion being adapted to rest upon a burner, the substantial thickness of said central major portion of the bottom facilitating the transmission of a substantial quantity of heat from the same to said annular upwardly inclined portion and thence to the cooking surface above the last named portion.

ARTHUR LINDZY.

REFERENCES CITED

The following references are of record in the file of this patent:

UNITED STATES PATENTS

| Number | Name | Date |
|---|---|---|
| 1,717,450 | Hostettler | June 18, 1929 |
| 1,733,450 | Detwiler | Oct. 29, 1929 |

FOREIGN PATENTS

| Number | Country | Date |
|---|---|---|
| 160,139 | Switzerland | May 1, 1933 |
| 185,600 | Great Britain | Sept., 1922 |
| 369,650 | Germany | Feb. 22, 1923 |